United States Patent
Yoo

(10) Patent No.: US 9,656,561 B2
(45) Date of Patent: May 23, 2017

(54) DOOR ASSEMBLY FOR CHARGING PORT OF ELECTRIC VEHICLE

(71) Applicant: HYUNDAI MOTOR COMPANY, Seoul (KR)

(72) Inventor: Gilsang Yoo, Incheon (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/921,745

(22) Filed: Oct. 23, 2015

(65) Prior Publication Data

US 2016/0144733 A1   May 26, 2016

(30) Foreign Application Priority Data

Nov. 24, 2014   (KR) .......................... 10-2014-0164779

(51) Int. Cl.
*B60K 15/05* (2006.01)
*B60L 11/18* (2006.01)
*E06B 3/34* (2006.01)

(52) U.S. Cl.
CPC ............ *B60L 11/1818* (2013.01); *E06B 3/34* (2013.01); *B60K 2015/0515* (2013.01); *Y02T 10/7005* (2013.01)

(58) Field of Classification Search
CPC ............ B60K 15/05; B60K 2015/0515; B60K 2015/0523; B60K 2015/053; B60L 11/1818; E06B 3/34; Y02T 10/7005
USPC ...................................................... 296/97.22
See application file for complete search history.

(56) References Cited

U.S. PATENT DOCUMENTS

| | | | | |
|---|---|---|---|---|
| 5,658,036 | A * | 8/1997 | Benoist ................. | B60K 15/05 220/86.2 |
| 6,189,959 | B1 * | 2/2001 | VanAssche ............ | B60K 15/05 16/86 B |
| 8,740,283 | B2 * | 6/2014 | Yamamaru .......... | B60L 11/1818 296/136.01 |
| 2010/0133024 | A1 * | 6/2010 | Miwa ..................... | B60K 6/365 180/65.21 |
| 2011/0140477 | A1 * | 6/2011 | Mihai .................... | B60K 15/05 296/97.22 |
| 2015/0102627 | A1 * | 4/2015 | Pickartz ............... | B60L 11/1818 296/97.22 |
| 2015/0375630 | A1 * | 12/2015 | Jeong ..................... | B60K 15/05 49/386 |
| 2016/0087375 | A1 * | 3/2016 | Yoshizawa ............... | B60K 1/04 439/345 |

FOREIGN PATENT DOCUMENTS

| | | |
|---|---|---|
| JP | 2013-233867 A | 11/2013 |
| JP | 5348756 B2 | 11/2013 |
| KR | 10-2003-0083772 A | 11/2003 |
| KR | 10-2006-0089050 A | 8/2006 |
| KR | 10-2013-0136290 A | 12/2013 |

* cited by examiner

*Primary Examiner* — Gregory Blankenship
(74) *Attorney, Agent, or Firm* — McDermott Will & Emery LLP

(57) ABSTRACT

A door assembly for a charging port of an electric vehicle includes a housing accommodating the charging port and a door connected to one side of the housing. A link bracket is mounted inside the door, and a link portion connects the housing with the link bracket. A crushing portion removes foreign materials being introduced in a slot formed at the link bracket.

12 Claims, 6 Drawing Sheets

DOOR ASSEMBLY FOR CHARGING PORT OF ELECTRIC VEHICLE

CROSS-REFERENCE TO RELATED APPLICATION

This application claims priority to and the benefit of Korean Patent Application No. 10-2014-0164779 filed in the Korean Intellectual Property Office on Nov. 24, 2014, the entire content of which is incorporated herein by reference.

TECHNICAL FIELD

The present disclosure relates to a door assembly for a charging port of an electric vehicle.

BACKGROUND

An electric vehicle uses one or more electric motors for generating torque using battery power and may achieve higher fuel efficiency compared to a general internal combustion engine vehicle.

The electric vehicle may be classified into an electric vehicle (EV), a hybrid electric vehicle (HEV), and a plug-in hybrid electric vehicle (PHEV) based on the use of electrical energy.

The EV uses the electric motor as a main torque source, and the HEV and the PHEV uses the electric motor as one of multiple torque sources.

The battery of the EV and the PHEV may be charged by an external power supply, and a charging port for receiving electrical power from the external power supply is mounted in the EV and the PHEV.

FIG. 1 is a diagram illustrating a door assembly for a charging port of an electric vehicle according to a related art.

Referring to FIG. 1, a door assembly for a charging port of an electric vehicle according to a related art includes a housing 100 in which the charging port for connecting an external power supply is mounted and a door 110 for protecting the housing 100.

The charging port receives AC power from an external power supply and converts the AC power into DC power to charge a battery of the electric vehicle.

The door 110 is connected with the housing 100 through a link portion 120. The link portion 120 is hinge-connected with the door 100 and the housing 100 through slots 130 formed at both sides of the door 110. Accordingly, the door 110 may be opened or closed in a sliding manner.

The link portion 120 includes a first link 121, a second link 123, and a third link 125. First ends of the first link 121 and the second link 123 are hinge-connected with the door 110, and second ends of the first link 121 and the second link 123 are hinge-connected with the housing 100.

A first end of the third link 125 is hinge-connected with one side of the second link 123, and a second end of the third link 125 is hinge-connected with the door 110 through a slot 130.

The door 110 is opened or closed while the second end of the third link 125 slides forward or backward along the slot 130.

However, in the door assembly for the charging port of the electric vehicle according to the related art, a freezing phenomenon may be generated due to moisture flowing into the slot 130 of the door 110 in the winter season, and thereby, it is difficult to open the door 110.

In addition, when the slot 130 is exposed to snow or rain while charging the battery of the electric vehicle, the freezing phenomenon may be generated, and thereby, it is difficult to close the door 110.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a door assembly for a charging port of an electric vehicle having advantages of suppressing a freezing phenomenon by blocking a moisture inflow into a door and removing foreign materials such as ice when the freezing phenomenon is generated.

A door assembly for a charging port of an electric vehicle according to an exemplary embodiment of the present inventive concept may include a housing accommodating the charging port and a door connected to one side of the housing. A link bracket is mounted inside the door and a link portion connects the housing with the link bracket. A crushing portion removes foreign materials being introduced in a slot formed at the link bracket.

The link portion may include a first link, a second link, and a third link. First ends of the first link and the second link are hinge-connected with the housing, and second ends of the first link and the second link are hinge-connected with the link bracket. A first end of the third link is hinge-connected with the second link, and a second end of the third link is hinge-connected with the link bracket through a slider.

A guide rail that guides the slider may be fitted to the slot. When the charging door is opened or closed, the slider may slide along the guide rail.

The crushing portion may include a slide pipe having teeth at an interior circumference thereof and penetration holes into which the slider is inserted at both sides thereof. A crusher is engaged with the teeth, and a rotation portion rotates the crusher when the door is opened or closed. An elastic portion provides elastic force to the slider when the door is opened or closed.

A first end of the slide pipe may be opened, and an end cap may be mounted at a second end of the slide pipe.

A rubber element may be attached at an exterior circumference of the slide pipe along a length direction thereof.

A first end of the crusher may have a tapered shape. An accommodating groove in which a first end of the rotation portion may be formed at a second end of the crusher, and a second end of the rotation portion may be supported by the slider.

Screw threads may be formed at an exterior circumference of the crusher.

The rotation portion may include a ball bearing.

The elastic portion may include a coil spring.

The elastic portion may be compressed when the door is closed, and may extend when the door is opened.

According to the exemplary embodiment of the present inventive concept, the rubber element is attached to the slide pipe, thereby suppressing moisture inflow into the slot.

In addition, when the slot is exposed to snow or rain while charging a battery of the electric vehicle and a freezing phenomenon is generated at the slot, foreign materials such as ice are crushed by the crusher while the crusher rotates and slides along the slide pipe having teeth, thereby allowing the door to be opened or closed smoothly.

Further, the effects which may be obtained or predicted by the exemplary embodiment of the present inventive concept will be directly or implicitly disclosed in the detailed description of the exemplary embodiments. That is, various effects which are predicted by the exemplary embodiment of the present inventive concept will be disclosed in the detailed description to be described below.

DETAILED DESCRIPTION OF THE EMBODIMENTS

Figure 1:
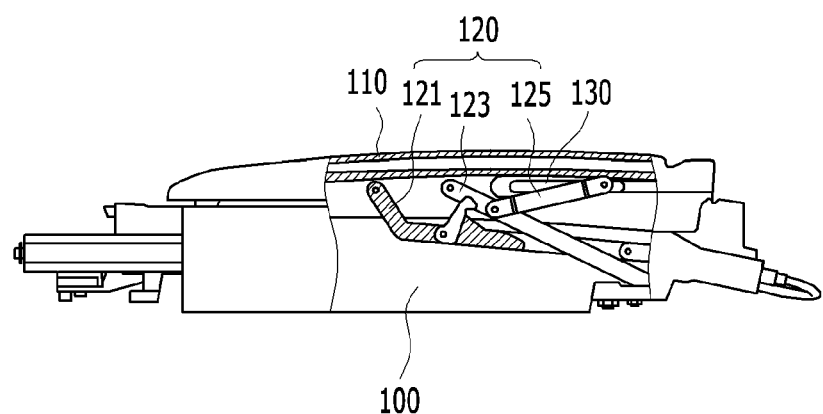
FIG. 1 is a diagram illustrating a door assembly for a charging port of an electric vehicle according to a related art.

In the following detailed description, the present disclosure will be described more fully with reference to the accompanying drawings, in which exemplary embodiments of the invention are shown. As those skilled in the art would realize, the described embodiments may be modified in various different ways, all without departing from the spirit or scope of the present disclosure.

The drawings and description are to be regarded as illustrative in nature and not restrictive. Like reference numerals designate like elements throughout the specification.

Since each component shown in the drawings is arbitrarily illustrated for easy description, the present disclosure is not particularly limited to the components illustrated in the drawings.

Figure 2A:
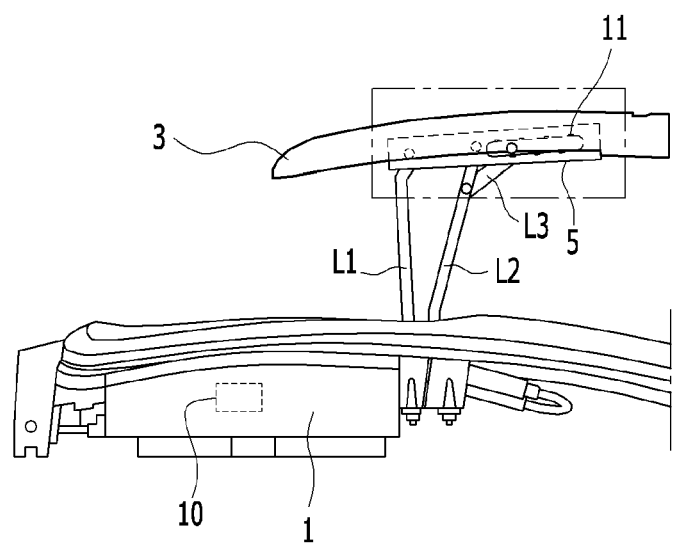
FIG. 2A is a diagram illustrating a diagram illustrating a door assembly for a charging port of an electric vehicle according to an exemplary embodiment of the present inventive concept.
Figure 2B:
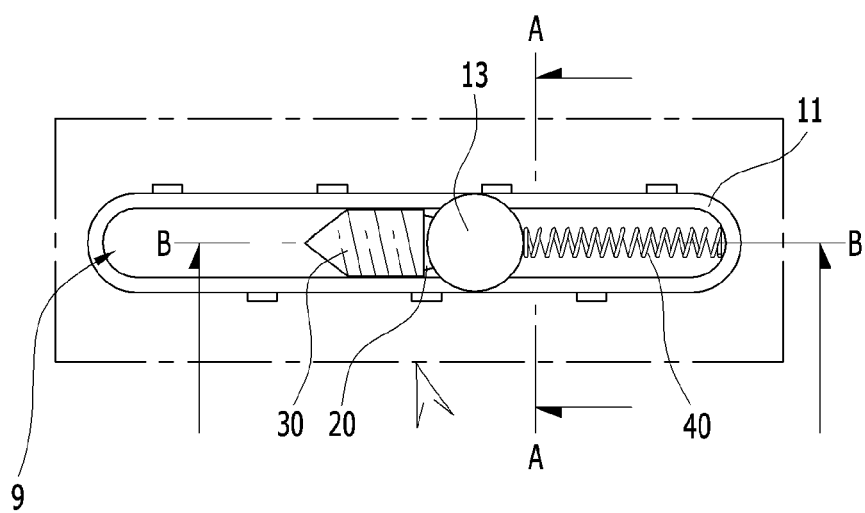
FIG. 2B is an extended view of a door of the charging door assembly according to the exemplary embodiment of the present inventive concept.
Figure 3:
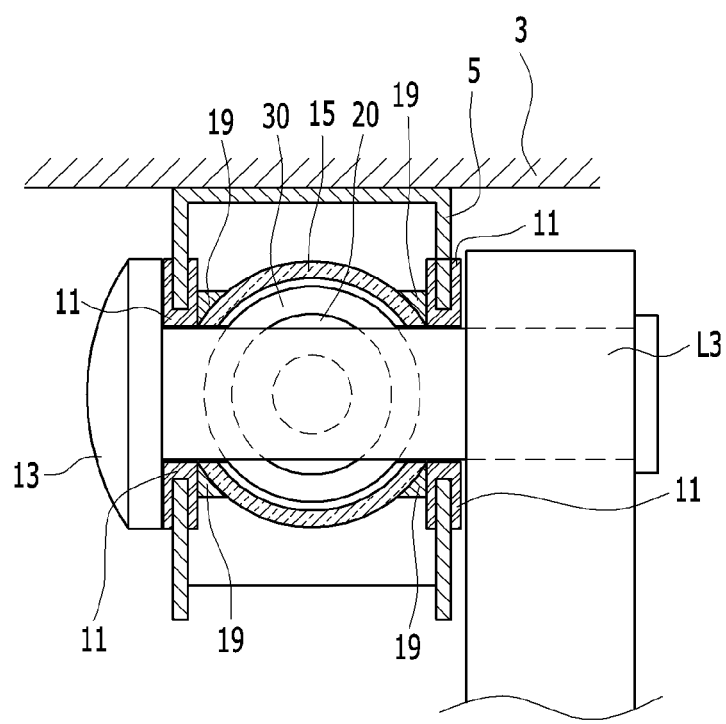
FIG. 3 is a cross-sectional view taken along the line A-A in FIG. 2B.
Figure 4:
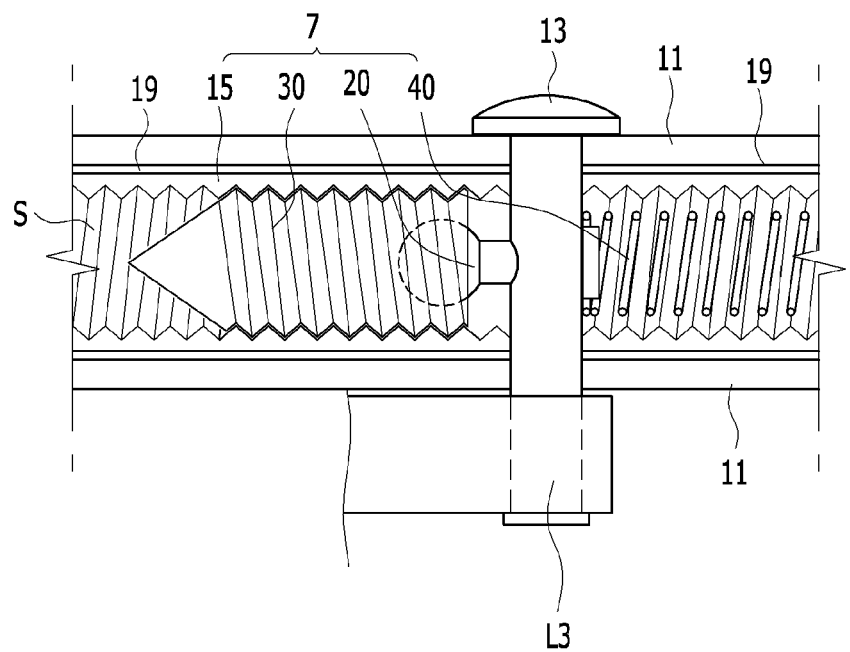
FIG. 4 is a cross-sectional view taken along the line B-B in FIG. 2B.
Figure 5:
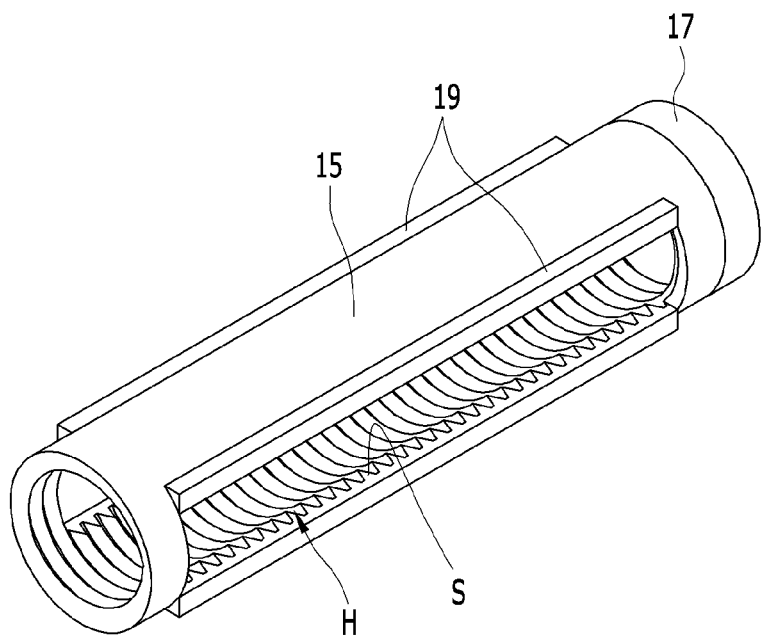
FIG. 5 is perspective view of a slide pipe according to an exemplary embodiment of the present inventive concept.

FIG. 2A is a diagram illustrating a diagram illustrating a door assembly for a charging port of an electric vehicle according to an exemplary embodiment of the present inventive concept, FIG. 2B is an extended view of a door of the charging door assembly according to the exemplary embodiment of the present inventive concept, FIG. 3 is a cross-sectional view taken along the line A-A in FIG. 2, FIG. 4 is a cross-sectional view taken along the line B-B in FIG. 2, and FIG. 5 is a perspective view of a slide pipe according an exemplary embodiment of the present inventive concept.

Referring to FIGS. 2A-4, a door 3 of a door assembly according to an exemplary embodiment of the present inventive concept is opened such that a charging port 10 is connected to an external power supply and is closed to prevent foreign materials or moisture from flowing into the charging port 10.

The door assembly according to the present disclosure may include a housing 1, the door 3, a link bracket 5, a link portion L, and a crushing portion 7.

The housing 1 is disposed at one side of a vehicle body and accommodates the charging port 10.

The door 3 is disposed at one side of the housing 1 to protect the charging port 10.

The link bracket 5 is mounted inside the door 3 along a length direction thereof, and a slot 9 is formed at one side of the link bracket 5.

A guide rail 11 is fitted to the slot 9 along a circumference thereof, and a slider 13 is inserted in the slot 9. The guide rail 11 guides the slider 13.

The link portion L connects the housing 1 with the door 3. The link portion L may include a first link L1, a second link L2, and a third link L3.

First ends of the first link L1 and the second link L2 are hinge-connected with the housing 1, and second ends thereof are hinge-connected with the link bracket 5.

A first end of the third link L3 is hinge-connected with the second link L2, and a second end thereof is hinge-connected with the link bracket 5 through the slider 13.

The slider 13 slides (reciprocates) along the guide rail 11 when the door 3 is opened or closed.

The crushing portion 7 removes foreign materials generated in the slot 9 according to movement of the slider 13, thereby smoothly opening or closing the door 3.

The crushing portion 7 may include a slide pipe 15, a crusher 30, a rotation portion 20, and an elastic portion 40.

Teeth S are formed at an interior circumference of the slide pipe 15. Penetration holes H in which the slider 13 is inserted are formed at both sides of the slide pipe 15.

A rubber element 19 having a watertight function is attached at an exterior circumference of the slide pipe 15 along a length direction thereof. In the present disclosure, four rubber elements 19 may be attached around the penetration holes H along a length direction thereof.

The rubber element 19 blocks moisture inflow into the door 3 while the slider 13 moves along the guide rail 11, thereby reducing a freezing phenomenon.

The crusher 30 is inserted in the slide pipe 15 and is engaged with the teeth S.

A first end of the crusher 30 may have a tapered shape, and an accommodating groove in which a first end of the rotation portion 20 is accommodated may be formed at a second end of the crusher 30. Screw threads may be formed at an exterior circumference of the crusher 30.

A second end of the rotation portion 20 is supported by the slider 13.

When the door 3 is opened or closed, the crusher 30 slides and rotates along to the teeth S formed at the interior circumference of the slide pipe 15.

The rotation portion 20 may include a ball bearing and supports the crusher 30.

The elastic portion 40 is inserted in the slide pipe 15 and provides elastic force to the slider 13 when the door 3 is opened or closed.

The elastic portion 40 may include a coil spring. The elastic portion 40 is compressed when the door 3 is closed, and extends when the door 3 is opened.

A first end of the slide pipe 15 is opened, and an end cap 17 for supporting the elastic portion 40 is mounted at a second end of the slide pipe 15.

That is, a first end of the elastic portion 40 is supported by the slider 13 and a second end of the elastic portion 40 is supported by the end cap 17.

The crusher 30 and the elastic portion 40 are supported by the slider 13. When the door 3 is opened, the elastic portion 40 extends and the crusher 30 rotates and moves forward along the teeth S formed at the interior circumference of the slide pipe 15.

When the door 3 is closed, the crusher 30 rotates and moves backward along the teeth S by operating force of a user transmitted through the third link L3. Here, the elastic portion 40 is compressed by the operating force.

Foreign materials such as ice in the slide pipe 15 are crushed by the crusher 30 while the crusher 30 rotates and slides forward along the slide pipe 15, and accordingly, the slider 13 can smoothly perform sliding movement.

While this invention has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. A door assembly for a charging port of an electric vehicle, comprising:
    a housing accommodating the charging port;
    a door connected to one side of the housing;
    a link bracket mounted inside the door;
    a link portion connecting the housing with the link bracket; and
    a crushing portion removing foreign materials being introduced in a slot formed at the link bracket.

2. The door assembly of claim 1, wherein the link portion includes a first link, a second link, and a third link,
    wherein first ends of the first link and the second link are hinge-connected with the housing, second ends of the first link and the second link are hinge-connected with the link bracket, and
    wherein a first end of the third link is hinge-connected with the second link, and a second end of the third link is hinge-connected with the link bracket through a slider.

3. The door assembly of claim 2, wherein a guide rail that guides the slider is fitted to the slot, and when the door is opened or closed, the slider slides along the guide rail.

4. The door assembly of claim 3, wherein the crushing portion includes:
    a slide pipe having teeth at an interior circumference thereof and penetration holes into which the slider is inserted at both sides thereof;
    a crusher engaged with the teeth;
    a rotation portion rotating the crusher when the door is opened or closed; and
    an elastic portion providing elastic force to the slider when the door is opened or closed.

5. The door assembly of claim 4, wherein a first end of the slide pipe is opened, and an end cap is mounted at a second end of the slide pipe.

6. The door assembly of claim 4, wherein a rubber element is attached at an exterior circumference of the slide pipe along a length direction of the slide pipe.

7. The door assembly of claim 4, wherein the crusher has a tapered shape at a first end thereof and an accommodating groove, in which a first end of the rotation portion is accommodated, at a second end thereof, and
    wherein a second end of the rotation portion is supported by the slider.

8. The door assembly of claim 4, wherein the crusher has screw threads formed at an exterior circumference thereof.

9. The door assembly of claim 4, wherein the rotation portion includes a ball bearing.

10. The door assembly of claim 4, wherein the elastic portion includes a coil spring.

11. The door assembly of claim 10, wherein the elastic portion is compressed when the door is closed, and extends when the door is opened.

12. The door assembly of claim 6, wherein a plurality of rubber elements are attached at edges of the penetration holes along the length direction of the slide pipe.

* * * * *